United States Patent
Wang et al.

(10) Patent No.: US 7,661,886 B2
(45) Date of Patent: Feb. 16, 2010

(54) APPARATUS FOR ELECTRO-OPTICAL DEVICE CONNECTION

(75) Inventors: William Wang, Pleasanton, CA (US); Darren S. Crews, Santa Clara, CA (US)

(73) Assignee: Emcore Corporation, Albuquerque, NM (US)

( * ) Notice: Subject to any disclaimer, the term of this patent is extended or adjusted under 35 U.S.C. 154(b) by 0 days.

(21) Appl. No.: 12/057,158

(22) Filed: Mar. 27, 2008

(65) Prior Publication Data

US 2008/0175547 A1 Jul. 24, 2008

Related U.S. Application Data

(63) Continuation of application No. 10/954,880, filed on Sep. 30, 2004, now Pat. No. 7,373,031.

(51) Int. Cl.
*G02B 6/36* (2006.01)
*G02B 6/12* (2006.01)

(52) U.S. Cl. ............................. 385/55; 385/14; 385/92

(58) Field of Classification Search ................. 385/55, 385/14, 92
See application file for complete search history.

(56) References Cited

U.S. PATENT DOCUMENTS

| | | | |
|---|---|---|---|
| 4,167,303 A | 9/1979 | Bowen et al. | |
| 4,461,537 A | 7/1984 | Raymer, II et al. | |
| 4,547,039 A | 10/1985 | Caron et al. | |
| 4,611,887 A * | 9/1986 | Glover et al. | 385/71 |
| 4,715,820 A | 12/1987 | Andrews, Jr. et al. | 439/59 |
| 4,772,081 A | 9/1988 | Borgos et al. | |
| 4,787,706 A | 11/1988 | Cannon et al. | |
| 4,798,440 A | 1/1989 | Hoffer et al. | |
| 4,856,899 A * | 8/1989 | Iwaoka et al. | 356/454 |
| 4,953,929 A | 9/1990 | Basista et al. | |
| 4,969,924 A | 11/1990 | Suverison et al. | |
| 4,986,625 A | 1/1991 | Yamada et al. | 350/96.2 |
| 4,992,055 A | 2/1991 | Brummans et al. | 439/78 |

(Continued)

FOREIGN PATENT DOCUMENTS

DE 39 10 166 11/1990

(Continued)

OTHER PUBLICATIONS

Intel TXN31015 4/2/1 Gbps Small Form Factor Optical Transceivers, Intel Corporation, 2004, ftp://download.intel.com/design/network/ProdBrf/30046302.pdf.

(Continued)

*Primary Examiner*—K. Cyrus Kianni

(57) ABSTRACT

An optical fiber connector for releasably coupling an optical fiber to an electro-optical module is disclosed. The optical fiber connector includes a housing, a strain relief, a fiber retention clip, and a pair of latching arms. The housing includes a housing bore defined through at least a portion of the housing and adapted to accommodate the exterior diameter of a typical optical fiber. The optical fiber extending through the strain relief and into the housing bore, terminating at an end of the housing. The optical fiber is retained by the housing by the utilization of the fiber retention clip. The latching arms are arranged to releasable attach the connector to an electro-optical device such that the optical fiber and an optical lens disposed in the electro-optical device are aligned.

17 Claims, 8 Drawing Sheets

U.S. PATENT DOCUMENTS

| | | | |
|---|---|---|---|
| 5,016,968 A | | 5/1991 | Hammond et al. |
| 5,037,175 A | | 8/1991 | Weber .......................... 385/76 |
| 5,039,194 A | | 8/1991 | Block et al. |
| 5,076,656 A | | 12/1991 | Briggs et al. |
| 5,104,243 A | | 4/1992 | Harding ....................... 385/84 |
| 5,123,071 A | | 6/1992 | Mulholland et al. |
| 5,206,986 A | | 5/1993 | Arai et al. ..................... 29/840 |
| 5,214,731 A | | 5/1993 | Chang et al. ................... 385/69 |
| 5,398,295 A | | 3/1995 | Chang et al. |
| 5,414,790 A | | 5/1995 | Lee et al. |
| 5,450,046 A | | 9/1995 | Kosugi et al. ................. 333/246 |
| 5,557,504 A | | 9/1996 | Siegel et al. ................. 361/773 |
| 5,574,812 A | | 11/1996 | Beier et al. |
| 5,578,796 A | | 11/1996 | Bhatt et al. ................. 174/260 |
| 5,613,025 A | | 3/1997 | Grois et al. |
| 5,657,144 A | * | 8/1997 | Tanaka et al. ................. 398/48 |
| D383,380 S | | 9/1997 | Kempf et al. |
| 5,675,682 A | | 10/1997 | De Marchi |
| 5,715,075 A | * | 2/1998 | Tanaka et al. ................. 398/48 |
| 5,742,719 A | | 4/1998 | Birnbaum |
| 5,748,821 A | | 5/1998 | Schempp et al. |
| 5,937,125 A | | 8/1999 | Creswick et al. ............. 385/88 |
| 6,045,270 A | * | 4/2000 | Weiss et al. ................... 385/59 |
| 6,201,704 B1 | | 3/2001 | Poplawski et al. |
| 6,212,324 B1 | | 4/2001 | Lin et al. |
| 6,220,873 B1 | | 4/2001 | Samela et al. |
| 6,220,878 B1 | | 4/2001 | Poplawski et al. |
| 6,227,721 B1 | | 5/2001 | Naito et al. |
| 6,267,606 B1 | | 7/2001 | Poplawski et al. |
| 6,331,079 B1 | * | 12/2001 | Grois et al. ................... 385/53 |
| 6,349,106 B1 | * | 2/2002 | Coldren ..................... 372/50.1 |
| 6,361,218 B1 | * | 3/2002 | Matasek et al. .............. 385/60 |
| 6,409,392 B1 | | 6/2002 | Lampert et al. |
| D467,553 S | | 12/2002 | Cheng |
| 6,580,739 B1 | * | 6/2003 | Coldren ................... 372/50.21 |
| 6,592,266 B1 | | 7/2003 | Hankins et al. |
| 6,607,400 B1 | | 8/2003 | Ko |
| 6,624,000 B1 | * | 9/2003 | Coldren ....................... 438/29 |
| 6,666,694 B1 | | 12/2003 | Daly et al. |
| 6,692,159 B2 | | 2/2004 | Chiu et al. |
| 6,692,161 B2 | | 2/2004 | Zaborsky et al. |
| 6,717,824 B2 | | 4/2004 | Miyajima et al. ........... 361/803 |
| 6,729,905 B1 | | 5/2004 | Hwang ...................... 439/607 |
| 6,795,481 B2 | * | 9/2004 | Maleki et al. ............... 372/108 |
| 7,051,433 B1 | | 5/2006 | Kwong et al. ................. 29/852 |
| 2002/0018611 A1 | * | 2/2002 | Maleki et al. ................. 385/15 |
| 2003/0029495 A1 | * | 2/2003 | Mazur et al. ................ 136/256 |
| 2003/0053762 A1 | | 3/2003 | Cheng et al. .................. 385/88 |
| 2003/0113071 A1 | | 6/2003 | Kim et al. ..................... 385/76 |
| 2003/0113077 A1 | | 6/2003 | Xu et al. ........................ 385/93 |
| 2003/0132026 A1 | | 7/2003 | Hwang Bo ................. 174/260 |
| 2003/0159280 A1 | | 8/2003 | Young et al. ................. 29/840 |
| 2003/0169975 A1 | | 9/2003 | Anderson et al. ............ 385/76 |
| 2004/0017983 A1 | * | 1/2004 | Chen et al. .................... 385/78 |
| 2004/0038563 A1 | | 2/2004 | Chin-Lung et al. ......... 439/76.1 |
| 2006/0067064 A1 | | 3/2006 | Crews et al. ................. 361/761 |

FOREIGN PATENT DOCUMENTS

| | | |
|---|---|---|
| EP | 0 685 750 | 12/1995 |
| EP | 1 048 965 | 2/2000 |
| EP | 1 065 751 | 1/2001 |
| EP | 1 074 869 | 2/2001 |
| EP | 1 112 612 | 7/2001 |
| GB | 2 316 550 | 2/1998 |
| JP | 58 174916 | 1/1984 |
| JP | 2002 202434 | 7/2002 |
| WO | 03/096097 | 11/2003 |

OTHER PUBLICATIONS

Configuration of Plastic Packages, National Semiconductor, 2003, www.national.com/quality/files/Package_Configuration.Plastic.pdf.

Intel TXN13600 10Gbps C-Band Tunable Optical Transceiver, http://www.intel.com/design/network/products/optical/phys/txn13600.htm.

Wiseman et al., "New Optical Packaging Required for 10-Gbit/sectransceiver Components," Lightwave, Oct. 2002 http://lightwave.articles.printthis.clicability.com/pt/cpt?action=cpt&title=New+optical+Package.

Intel TXN13220/1/5/7 Small Form Factor 10Gbps Optical Transceivers, http://www.intel.com/design/network/products/optical/phys/txn13220.htm.

Intel Technology Journal, Optical Technologies for Enterprise Networks, Intel Corporation, vol. 8, Issue 2, May 10, 2004.

Intel Technology Journal, 10Gb/s Optical Transceivers: Fundamentals and Emerging Technologies, Intel Corporation, vol. 8, Issue 2, May 10, 2004.

Intel TXN3101 4/2/1 Gbps Small Form Factor Optical Transceivers, Intel Corporation, 2004.

International Search Report for PCT/US2005/035491 mailed Mar. 21, 2006.

Invitation to Pay Additional Fees—Partial International Search for PCT/US2005/031313 mailed Mar. 16, 2006.

Invitation to Pay Additional Fees—Partial International Search for PCT/US2005/035491 mailed Feb. 6, 2006.

Written Opinion for PCT/US2005/035491 mailed Mar. 21, 2006.

International Search Report and Written Opinion for PCT/US2005/031313 dated May 15, 2006.

International Search Report and Written Opinion of the International Searching Authority for PCT/US2005/031313 dated Aug. 17, 2006.

International Preliminary Report on Patentability for International Application No. PCT/US2005/031313 dated Apr. 3, 2007.

Written Opinion of the International Searching Authority for International Application No. PCT/US2005/031313, dated Apr. 3, 2007.

International Preliminary Report on Patentability for International Application No. PCT/US2005/035491 dated Apr. 3, 2007.

Written Opinion of the International Searching Authority for International Application No. PCT/US2005/035491 dated Apr. 3, 2007.

* cited by examiner

APPARATUS FOR ELECTRO-OPTICAL DEVICE CONNECTION

CROSS REFERENCE TO RELATED APPLICATION

This patent is a continuation of U.S. Ser. No. 10/954,880, filed Sep. 30, 2004, the contents of which are expressly incorporated by reference herein. This application is related to U.S. patent application Ser. No. 10/955,876 entitled "Apparatus for Electrical and Optical Interconnection," filed Sep. 30, 2004, the contents of which are incorporated herein by reference in their entirety.

FIELD OF THE DISCLOSURE

The present disclosure relates generally to an apparatus for an electro-optical device connection and, more specifically, to an optical fiber connector with an integrated latch design for interfacing to an electro-optical device.

BACKGROUND OF RELATED ART

It is known that electrical devices may utilize an optical network to communicate between the devices. In such circumstances, it is not uncommon for electrical device to convert electrical signals to an optical signal, and to transmit the signal through an optical fiber to another electrical device. The second electrical device may then convert the optical signal back into an electrical signal to continue processing.

In some instances, the alignment between the optical fiber and the electronic device may be performed by soldering the optical fiber directly to the device, or to a support structure aligned with the device. In still other instance, the optical fiber may be removably aligned with the optical fiber by means of an optical fiber connector. In any instance, a proper alignment of the optical fiber to the receiver/transmitter of the electrical signal allows the signals to properly operate and to minimize the loss of signal due to interference and/or misalignment.

Additionally, with an emphasis in some manufacturing processes towards smaller and sometimes more inter-connected electrical devices, the optical fiber connections between devices sometimes is strained. For example, in some circumstance, the optical fibers utilized in the connection of electrical devices are smaller, more flexible, and yet are called upon by manufacturers and/or consumers to be securely and precisely aligned to avoid the loss of signal. In some instances, such as for example in the connection of a typical laptop computer, the fiber optic cable may be called upon to span a flexible, moving hinge, such as when the optical fiber spans the folding hinge between the laptop display and the keyboard.

As electro-optical networks and connections become more diverse in type, size, and more complex in operation, more optical connections are needed. Therefore, optical fiber connections are often called upon to be aligned with the connected components, while minimizing the space the connector occupies.

DETAILED DESCRIPTION OF AN EXAMPLE

The following description of the disclosed embodiment is not intended to limit the scope of the invention to the precise form or forms detailed herein. Instead the following description is intended to be illustrative of the principles of the invention so that others may follow its teachings.

Figure 1:
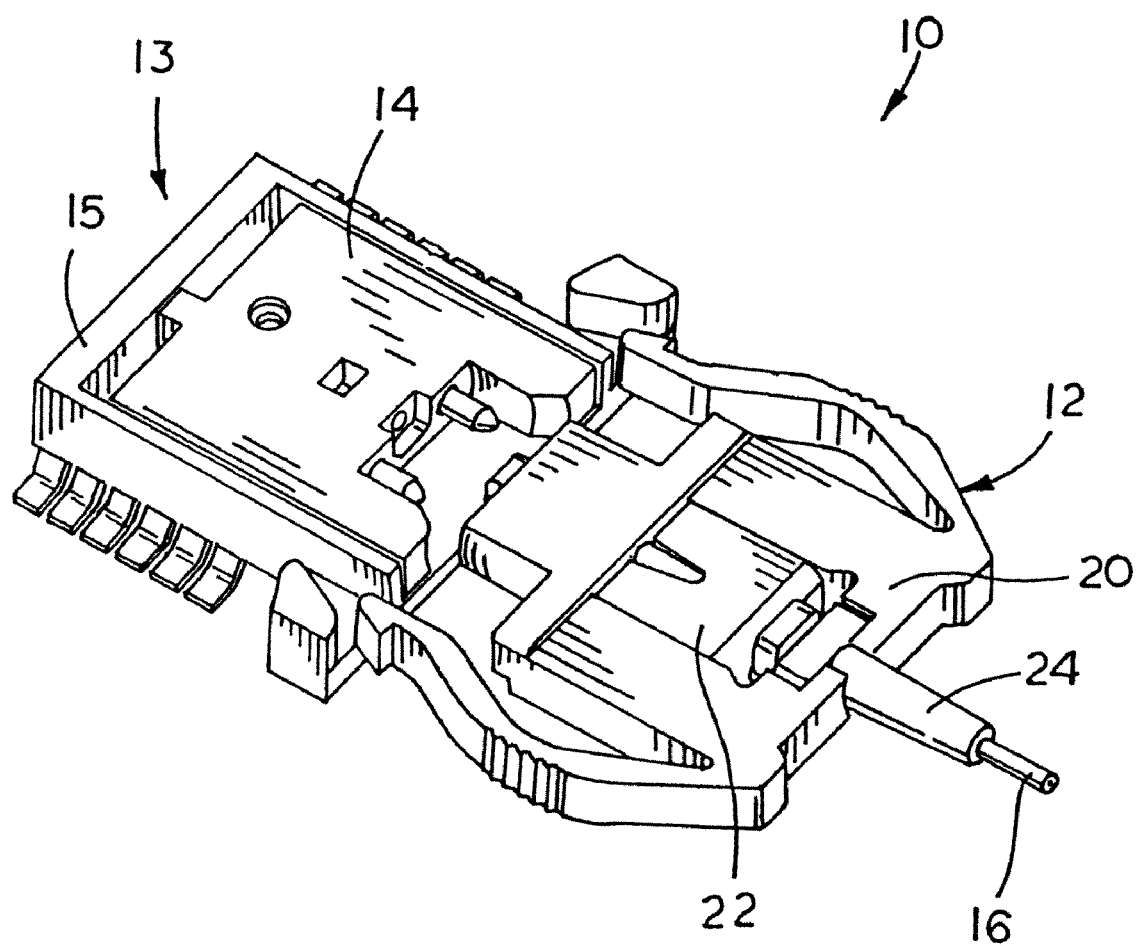
FIG. 1 is a front perspective view of an embodiment of an electro-optical connection assembly including an optical fiber connector and an electro-optical module disposed on a lead frame.

Referring now to FIG. 1, an example of an electro-optical connection assembly 10 is shown in perspective view. In this embodiment, the assembly 10 includes an optical fiber connector 12 and an electro-optical module 14 disposed on a lead frame 15. The electro-optical module 14 and the lead frame 15 being collectively referred to as an active circuit 13. The optical fiber connector 12 is removably connectable to the electro-optical module 14 to secure and optically couple an optical fiber 16 with the electro-optical module 14. In one example, the optical fiber 16 is a typical fiber optic which may be, for instance, a flexible plastic optic fiber, glass fiber, or any other optical fiber.

Figure 2:
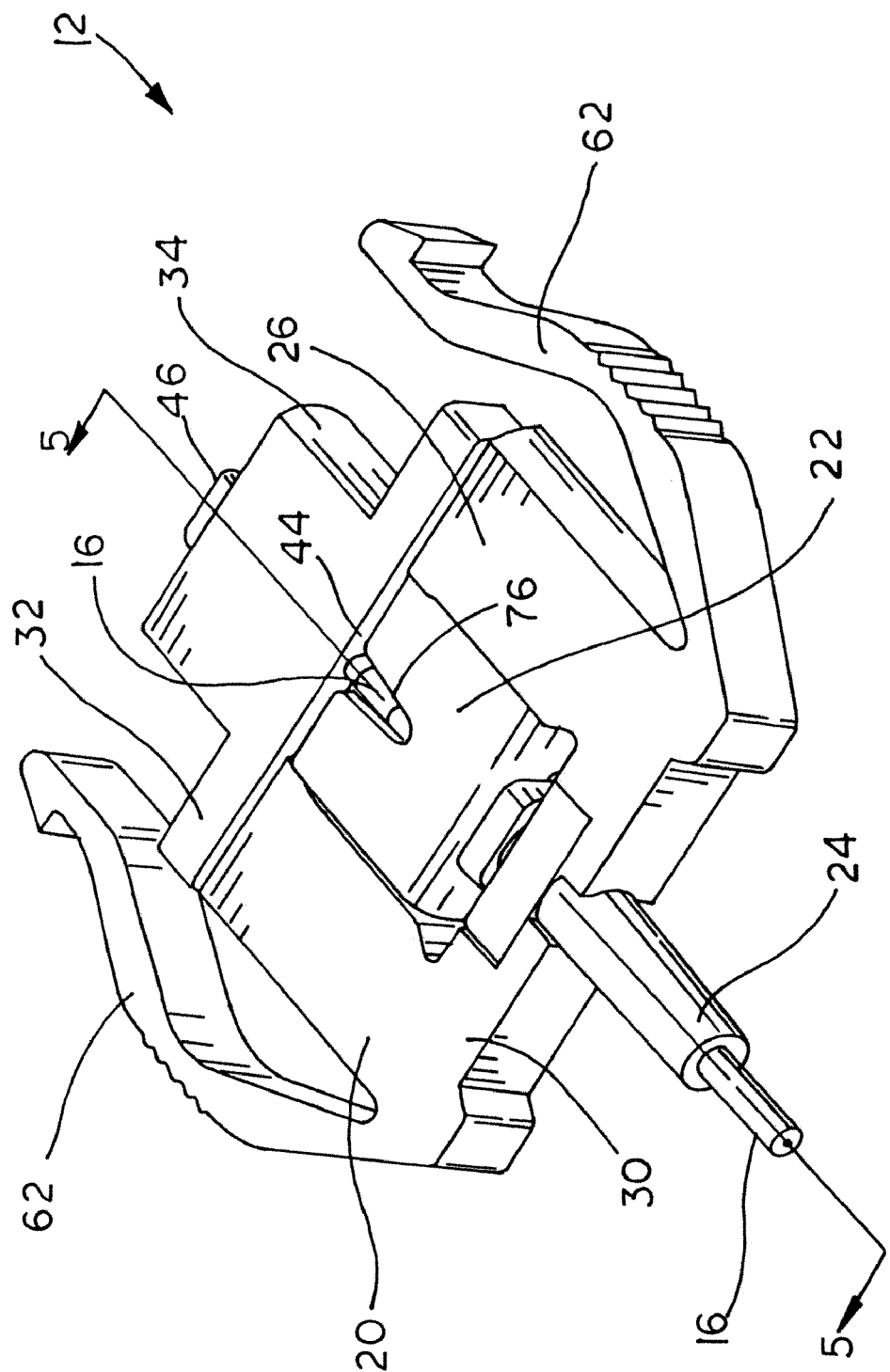
FIG. 2 is a front perspective view of the optical fiber connector of FIG. 1
Figure 3:
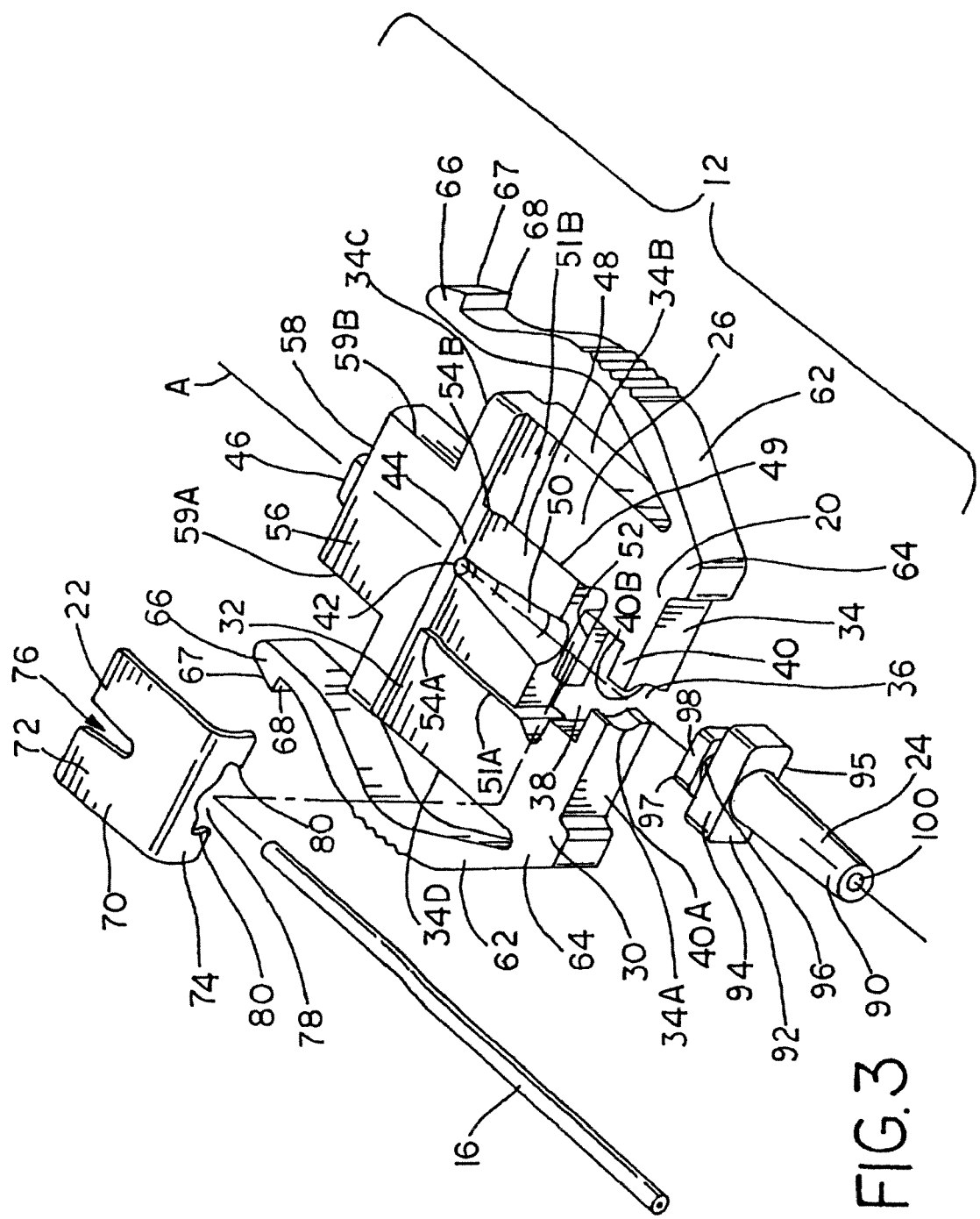
FIG. 3 is an exploded front perspective assembly view of the optical fiber connector of FIG. 2.

Turning first to the construction of the optical fiber connector 12, as best shown in FIGS. 2 and 3 of the drawings, the optical fiber connector 12, generally includes a connector housing 20, a fiber retaining clip 22 and an optional strain relief 24, which when assembled, together retain and secure the optical fiber 16 within the connector 12, as will be described below. The connector housing 20 includes a top side 26, a bottom side 28 (concealed in FIGS. 2 and 3, and best viewable in FIG. 5), a first end portion 30, a second end portion 32, and a peripheral or surrounding edge 34. The surrounding edge 34 includes a first edge 34A, a second edge 34B, a third edge 34C opposite the first edge 34A, and a fourth edge 34D, opposite the second edge 34B. A slot 38 along with a flange 40 are defined in the housing 20 proximate the first edge 34A and extending between the top side 26 and the bottom side 28. In the illustrated example, the flange 40 includes a pair of generally curved side portions 40A, 40B bounding an aperture 36 shaped to corresponding roughly to the curvature of the strain relief 24. As will be explained below, the slot 38, flange 40 and aperture 36 cooperate to removably retain the strain relief within the housing 20. The housing 20 has a generally uniform height H (FIG. 6), which in this example has a maximum value of approximately 2 mm. The height H may vary, however, depending upon design constraints, such as for instance, the exterior diameter of the optical fiber 16.

To allow for the mounting of the optical fiber 16, the housing 20 includes a bore 42, which extends generally along a central longitudinal axis A of the housing 20 between at least a portion of the slot 38 and the second end portion 32. The bore 42, in the disclosed example, is disposed opposite the aperture 36 and extends through at least a portion of the housing 20 between a depression wall 44 and a connector interface 46. The bore 42 is sized to permit placement of the optical fiber 16 through at least a portion of the bore 42. Further, while the bore 42 is illustrated as an enclosed tunnel bore, the bore 42 may also be partially enclosed, exposing the optical fiber 16.

To aid in the mounting of the fiber retaining clip 22, the top side 26 of the housing 20 includes a generally planar cut out depression 48, which extends along the longitudinal axis A between the slot 38 and the depression wall 44. The depression 48 includes an interior perimeter edge 49 bounded by at least a portion of the depression wall 44, a first edge 51A, and a second edge 51B opposite the first edge 51A. The depression 48 forms a seat sized to permit the fiber retaining clip 22 to be placed and secured into the depression 48 from above, within the depression wall 44 the first and second edges 51A, 51B. When assembled, the depression 48 and the mounted fiber retaining clip 22 allow passage of the optical fiber 16 there through.

The depression 48 includes a converging channel 50 defined in the top surface 26 of the connector 12 and extending along the axis A between the slot 38 and the depression wall 44 to support the optical fiber 16. The channel 50 and the bore 42 are aligned, and in this example, are adjacent one another. Together, the converging channel 50 and the bore 42 are sized such that the optical fiber 16 may be disposed therein. The diameter of the converging channel 50 may decrease in size from the end disposed adjacent the slot 38 toward the end disposed adjacent the bore 42 such that the diameter of the converging channel 50 near the bore 42 closely matches the diameter of the bore 42.

The depression 48 may further include a pair of fiber clip retention tabs 54A and 54B extending inwardly from the interior perimeter edge 49 and into the depression 48 to aid in the retention of the fiber retaining clip 22 within the depression 48. For example, the fiber clip retention tab 54A extends inwardly from the first edge 51A, while the fiber clip retention tab 54B extends inwardly from the second edge 51B. The space between the two tabs 54A and 54B is sized to match or be slightly smaller than the width of the fiber retaining clip 22. In this way, the retention tabs 54A, and 54B frictionally retain the fiber retaining clip 22 within the depression 48, when the fiber retaining clip 22 is placed into the depression 48 from above. For example, the fiber retaining clip 22 may be frictionally attached to the housing 20 within the depression 48 by placing the fiber retaining clip 22 within the depression 48 such that the tabs 54A and 54B engage and retain the fiber retaining clip 22. Additionally, when seated within the depression 48, the fiber retaining clip 22 is substantially coplanar with the housing 20.

To further assist in the retention of the fiber retaining clip 22 within the depression 48, the housing 20 may additionally include a clip retention tab 52 extending outwardly from the housing below the converging channel 50 and into the slot 38. In this embodiment, the clip retention tab 52 is sized to correspond to the width of a cutout formed in the fiber retaining clip 22 and described below. Each of the sides of the clip retention tab 52 may slope inwardly from the top to the bottom, such that the width of the clip retention tab 52 nearest the channel 50 is greater than the width of the clip retention tab 52 furthest from the channel 50. In this way, the fiber retention clip 22 may "snap-fit" over the clip retention tab 52.

Figure 4:
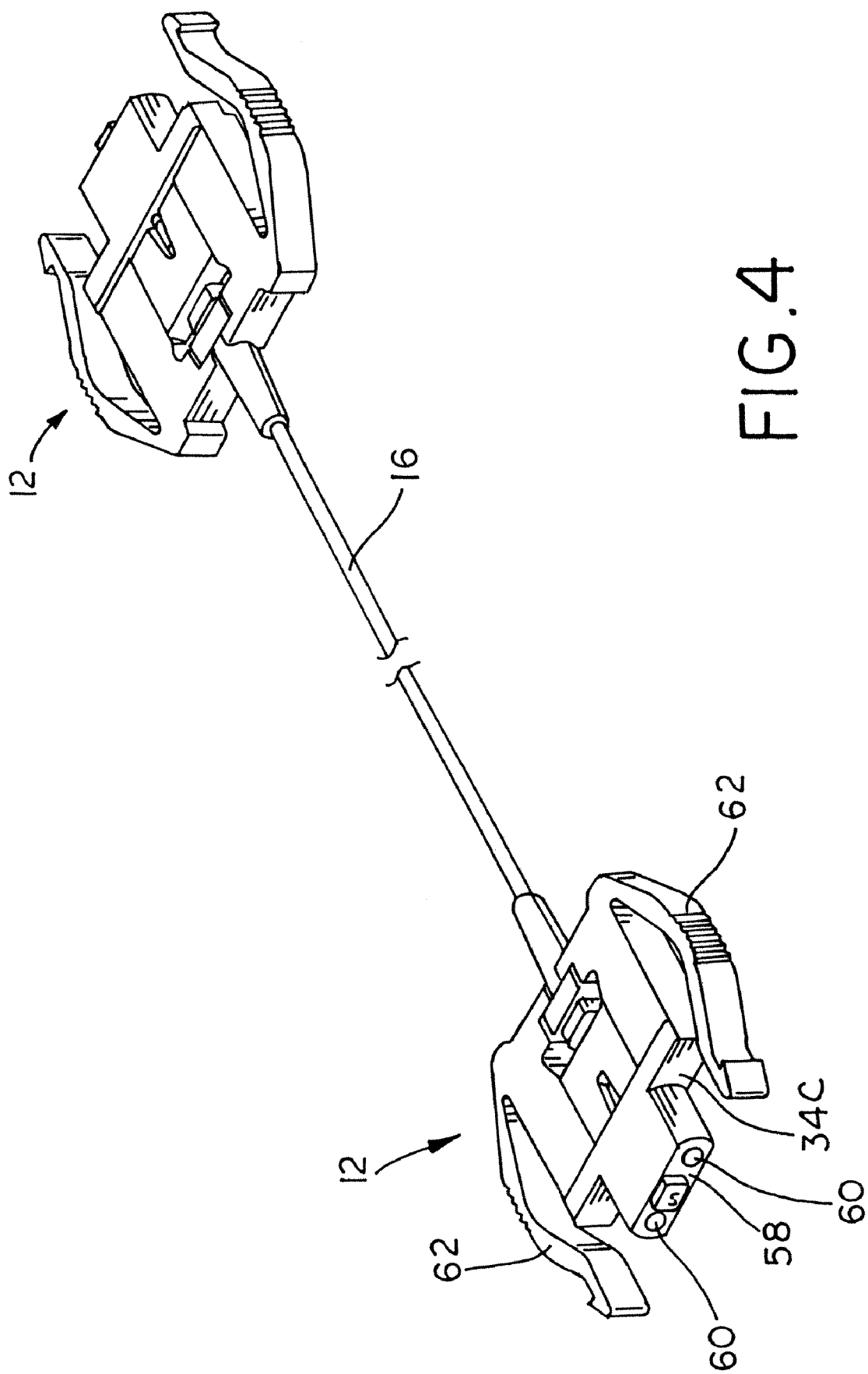
FIG. 4 is a top perspective view of an optical fiber having the optical fiber connector of FIG. 2 assembled on each end.

As best shown in FIGS. 2-4, the housing 20 additionally includes a mating extension 56 disposed opposite to the aperture 36, and extending outwardly from the third edge 34C. The mating extension includes an interface edge 58 and a pair of side edges 59A, 59B extending between the third edge 34C of the housing 20 and the interface edge 58. The mating extension 56 also includes the connector interface 46 which extends outwardly from the interface edge 58 along the axis A. As described above, the bore 42 extends through at least a portion of the housing 20, and more particularly through the mating extension 56 between the depression wall 44 and the connector interface 46. Additionally, as best shown in FIG. 4, the interface edge 58 includes a pair of female alignment bores 60 extending inwardly into the mating extension 56. The alignment bores 60 are configured to mate with a pair of corresponding male alignment posts disposed on the electro-optical module 14 as will be described below.

Extending from or near the first end portion 30 of the housing 20 are a pair of biased pivoting latching arms 62. In this example, the arms 62 are leaf spring shaped flexible fingers extending outwardly from the peripheral edge 34, in this case the second edge 34B and the fourth edge 34D, and running along the length of the housing 20 towards the second end portion 32. Each of the arms 62 is integrally attached to the housing 20 with each arm 62 pivoting about a corresponding attachment point 64 near the first edge 34A. Each of the arms 62 is shiftable or bendable between a releasing position (FIG. 8) wherein the arms 62 are shifted towards the connector 12 in the direction of the arrows R, and a locking position (shown in phantom in FIG. 8, and see also FIG. 9) wherein the arms 62 are shifted away from the connector 12 in the direction of the arrows L. The arms 62 can be physically bent inward to the releasing position.

Figure 9:
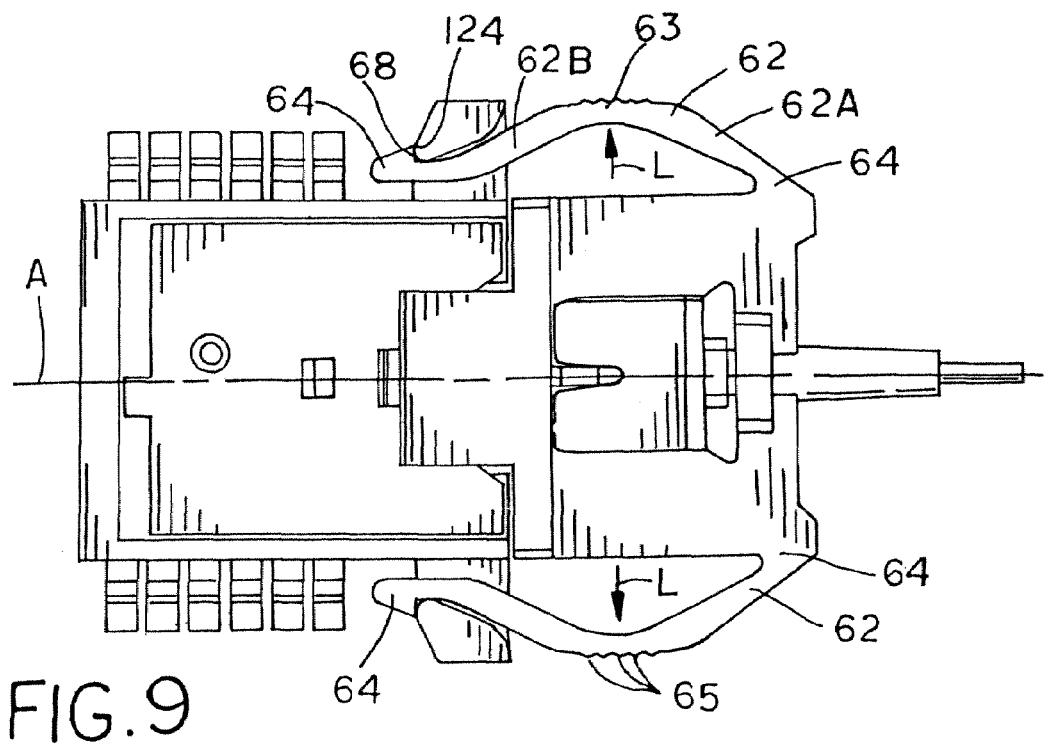
FIG. 9 is a plan view of the electro-optical connector assembly similar to FIG. 7, showing the optical fiber connector mounted to the electro-optical module.

For example, in the illustrated embodiment, each of the latch arms 62 includes a first portion 62A and a second portion 62B connected at an interface point 63 forming a pivot (see FIG. 9). As described earlier, each latch arm 62 is attached to the housing 20 at the attachment point 64, forming another pivot. Therefore, in operation, the latching arms 62 are shiftable between the locked position and the releasing position by pivoting about both the interface point 63 and the attachment point 64.

Each of the arms 62 further includes a plurality of ridges 65 disposed on the outer surface of each latch arm 62 to provide a grip for an operator to utilize during movement of each arm 62. Still further, each arm 62 includes an outwardly extending locking projection 66 disposed on an end of the arm 62 opposite the corresponding attachment point 64. In this example, the locking projections are generally hook shaped portions having a leading camming surface 67 and a locking surface 68. The arms 62 and the locking projections 66 are utilized to removeably couple the connector 12 to a pair of corresponding optics connectors 80 disposed on the electro-optical module 14 as will be described below.

Figure 5:
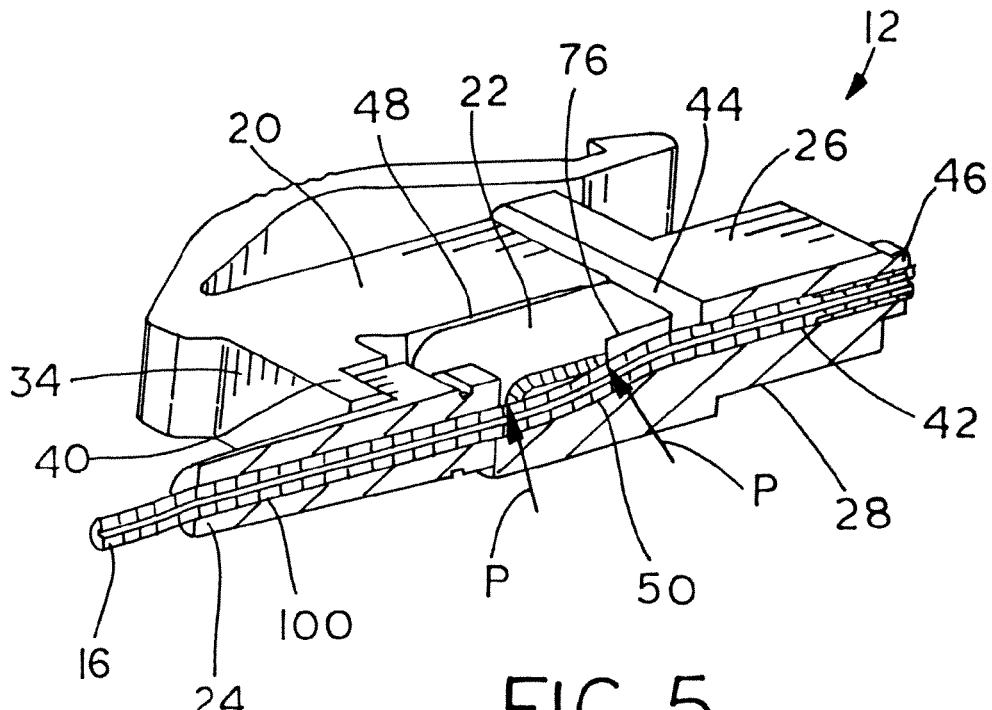
FIG. 5 is a top perspective cross sectional view of the optical fiber connector taken along line 5-5 of FIG. 2.

Turning now to the fiber retaining clip 22, as illustrated in FIGS. 2 and 3, an example of the fiber retaining clip 22 includes a generally L-shaped clip wall 70 having a top portion 72 and a side portion 74 bent approximately 90 degrees from the plane of the clip wall 70. As described above, the top portion 72 is sized so as to be seated and retained within the depression 48. In this example, once seated within the depression 48, the top portion 72 is substantially flush with the top side 26. The top portion 72 of the clip wall 70 includes a first cutout 76 formed in the top portion 72 and extending along a portion of the top portion 72. As best shown in FIGS. 2 and 5, when assembled to the connector 12, the first cutout 76 allows the optical fiber 16 to pass through the plane of the top portion 72 of the clip wall 70 as the fiber transitions between the converging channel 50 and the bore 42.

Meanwhile, the side portion 74 of the clip wall 70 is sized so as to be insertable into the slot 38. Additionally, the side portion 74 of the clip wall 70 includes a second cutout 78 formed in the side portion 74 and extending along at least a portion of the side portion 74. The second cutout 78 fits over the clip retention tab 52 when assembled and "snap-fits" over the tab 52. For instance, in this example, the second cutout 78 includes a pair of detents 80, spaced apart on opposite sides of the cutout 78 to frictionally engage the clip retention tab 52, and specifically the side edges 59A and 59B when pressed over the tab 52.

FIGS. 2 and 3 also illustrate an embodiment of the strain relief 24. The strain relief may provide protection against severe bending of the optical fiber 16 when retained within the connector 12. In the illustrated example, the strain relief includes a generally cylindrical end portion 90, a first flange 92 having oppositely located flats 94 and 95, followed by a generally cylindrical middle portion 96 which ultimately terminates with a second flange 97 having oppositely located flats 98 and 99 (hidden in FIGS. 2 and 3). A cylindrical bore 100 axially aligned through the strain relief 24 is sized to accommodate the exterior diameter of the optical fiber 16.

The strain relief 24 is arranged to permit latching attachment within the aperture 36 and the slot 38 as illustrated in FIG. 2. In particular, the first flange 92 of the strain relief 24 is sized to fit within the slot 38, such that the cylindrical end portion 90 extends through the aperture 36. Additionally, the second flange 97 bears against the clip retention tab 52 to assist in pressure fitting the strain relief 24 and the fiber retention clip 22 within the slot 38 as well as to assist in aligning the bore 100 with the converging channel 50. In this way, when assembled, the optical fiber 16 may extend through the strain relief 24, through the channel 50, and into the bore 42.

In the disclosed embodiment, the housing 20, the latching arms 62 and the strain relief 24 are constructed of plastic material, while the fiber retention clip is construed of a metal material. It will be understood, however, that each of the components may be constructed of any suitable material including, for example, any thermoplastic, Polyvinyl Chloride (PVC), polypropylene or copolymer polypropylene, polyethylene or copolymer polyethylene, polyester or polyester alloy, styrene based materials such as HIPS, ABS or ABS alloys, acrylics, metal, glass, or any other suitable material.

Additionally, while each of the disclosed components are described as having a specific shape and interconnection, it will be understood that the components may be constructed of any suitable shape. For example, the housing 20 may be constructed in any polygonal shape, such as a rectangular shape, or other suitable arrangement. Additionally, the strain relief 24 may, for example, include a plurality of apertures along the cylindrical end portion 90 to aid in the prevention of strain on the optical fiber 16. Additionally, the strain relief 24 may be mounted to the housing utilizing any suitable mounting means, including, for example, integral molding, the use of any number of flange and slot arrangements, or other suitable means. Still further, the fiber retention clip 22 may be mounted to the housing 20 utilizing any suitable means, including for instance, snap-fit, pressure-fit, slot and flange, adhesive/solder, or other suitable arrangement.

Turning now to FIGS. 2, and 4-6, an example of an assembled fiber connector 12 is shown. In the illustrated example, an end of the optical fiber 16 is threaded through the cylindrical bore 100 of the strain relief 24, with a portion of the optical fiber 16 extending past the second flange 97. The optical fiber 16 is also threaded through the channel 50 and into bore 42 of the housing 12, such that the end of the optical fiber 16 terminates at the connector interface 46. The strain relief 24 is then seated within the slot 38 of the housing 20 such that, in this example, the bore 100 of the strain relief 24 and the bore 42 of the housing 20 are axially offset (see FIG. 6).

Figure 6:
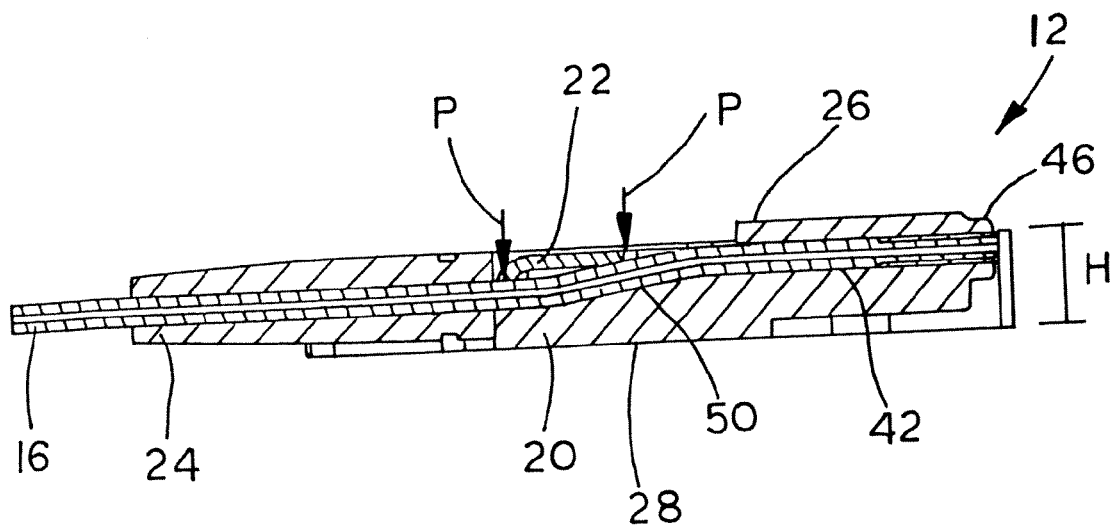
FIG. 6 is a cross sectional view of the optical fiber connector of FIG. 5.

To lock the assembly in place, the retention clip 22 is pressed into the depression 48, effectively clamping the optical fiber 16 within the connector 12. For example, as illustrated in FIG. 6, the clip 22 clamps the optical fiber 16 along at least two retention pressure points P, securing the fiber 16 within the housing 20, as the fiber 16 transition between the two offset bores 100 and 50. The cutout 76 and the fiber 16 form a wedge (see FIG. 6) to hold down the fiber 16, such that the fiber 16 cannot be pulled from the connector housing 20 without significant effort. By varying the length of the cutout 76 and the height of the cutout 78 of the clip 22 (see FIG. 3), the force exerted on the fiber 16 by the pressure points P may be adjusted for various design constraints. By placing an assembled connector 12 on each side of the optical fiber 16, as shown in FIG. 4, the optical fiber 16 may be removably connected to a plurality of electro-optical modules 14, or any other suitable module, such as an optical circuit.

Figure 7:
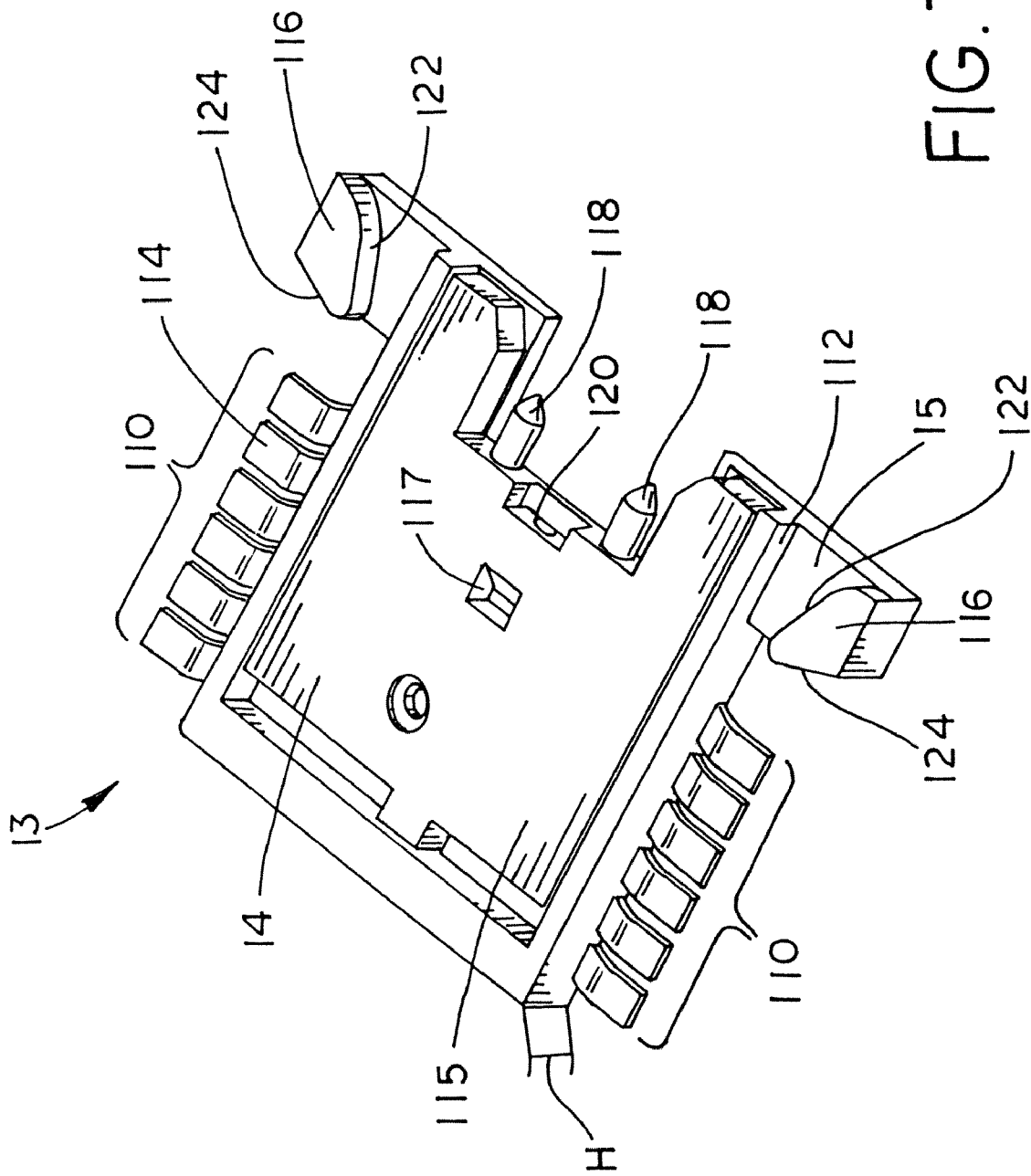
FIG. 7 is a top perspective view of an embodiment of the electro-optical module and the lead frame combination of FIG. 1.

Referring now to FIG. 7, an example of the active circuit 13 including the electro-optical module 14 coupled with the lead frame 15 is shown. In this example, the lead frame 15 is a molded lead frame which includes an interconnect 10 disposed on or embedded in a lead frame substrate 112. In particular, the interconnect 110 is an electrical lead frame formed into a wiring pattern. The electrical lead frame 110 operatively couples the components of the electro-optical module 14, and further operatively couples the lead frame 15 with a circuit substrate (not shown) via one or more electrical leads 114. The active circuit 13 has the same generally uniform height H (FIG. 7), as the connector 12, which in this example has a maximum value of approximately 2 mm. Again, the height H may vary, however, depending upon design constraints, such as for instance, the size of the lead frame 15.

An optical mirror and/or optical lens 117 may be provided in a protective case 115 and is optically coupled to the electro-optical module 14. The lead frame substrate 112 includes an enclosure to mount the electro-optical module 14, and further includes optics connectors 116. The optics connectors 116 include camming surfaces 122 and retaining surface 124 and may receive the spring-biased latching arms 62 of the optical fiber connector 12. The optics connectors 116 assists to secure and optically couple the connector 12 with the electro-optical module 14.

The electro-optical module 14 may further include male alignment posts 118 located on either side of an optical interface 120. The male alignment posts 118 may engage corresponding female alignment bores 60 of the optical connector 12, while the optical interface 120 is sized to seat the connection interface 46 of the connector 12. The alignment posts 118 may thereby assist in aligning and optically coupling the optical connector 12 with the optical lens 117.

Figure 8:
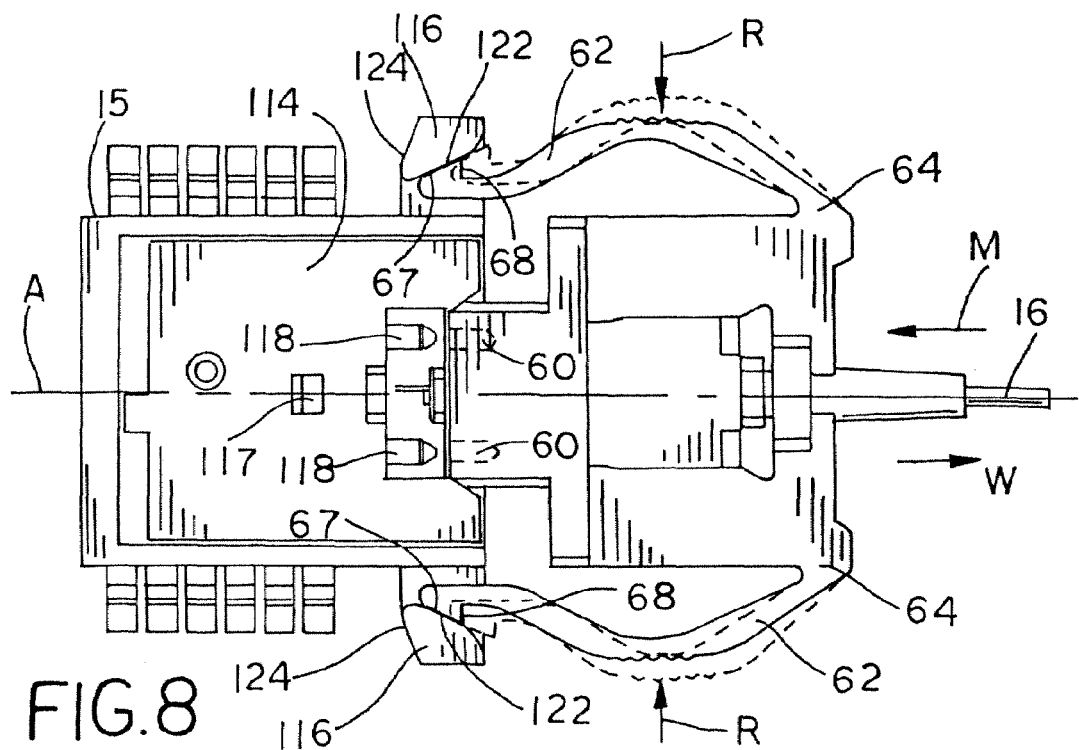
FIG. 8 is a plan view of the electro-optical connector assembly of FIG. 1 showing the optical fiber connector being inserted and/or removed from the electro-optical module.

FIGS. 8 and 9 show the connector 12 and the electro-optical module 14 in connecting operation. As illustrated in FIG. 8, as the connector 12 is moved in the direction of the arrow M, the leading camming surface 67 of each of the locking projections 66 engages the camming surface 122 of each of the corresponding optics connector 116, forcing the pivoting latching arms 62 to deflect inwards towards the central axis A and the releasing position. As the connector 12 continues in the direction of the arrow M, the male alignment posts 118 engage the female alignment bores 60 (shown in phantom), to aid in the alignment of the insertion.

Once the connector 12 is moved sufficiently in the direction of the arrow M, as shown in FIG. 9, the camming surface 67 if each of the locking projections 66 moves past the camming surface 122 of each of the corresponding optics connectors 116. The latching arms 62 may then bias away from the central axis A and toward the locking position, such that the locking surface 68 of each of latching arms 62 is retained by the retaining surface 124 of each of the corresponding optics connectors 116. When retained within the electro-optical module 14, the connector 12 aligns and operatively couples the optical fiber 16 with the optical lens 117.

To release the connector 12 from the electro-optical module 14, the latching arms 62 may be physically depressed toward the central axis A and in the direction of the arrows R (FIG. 8) until the locking surface 68 of each of latching arms 62 is deflected enough to clear the retaining surface 124 of each of the corresponding optics connectors 116, thereby allowing the connector 12 to be removed from the electro-optical module 14 in the direction of the arrow W. The connector 12 may therefore be removably coupled to the electro-optical module 14 as desired. Additionally, by connecting an assembly similar to FIG. 4 to a pair of active circuits 13, the two active circuits 13 may be communicatively coupled together.

Figure 10:
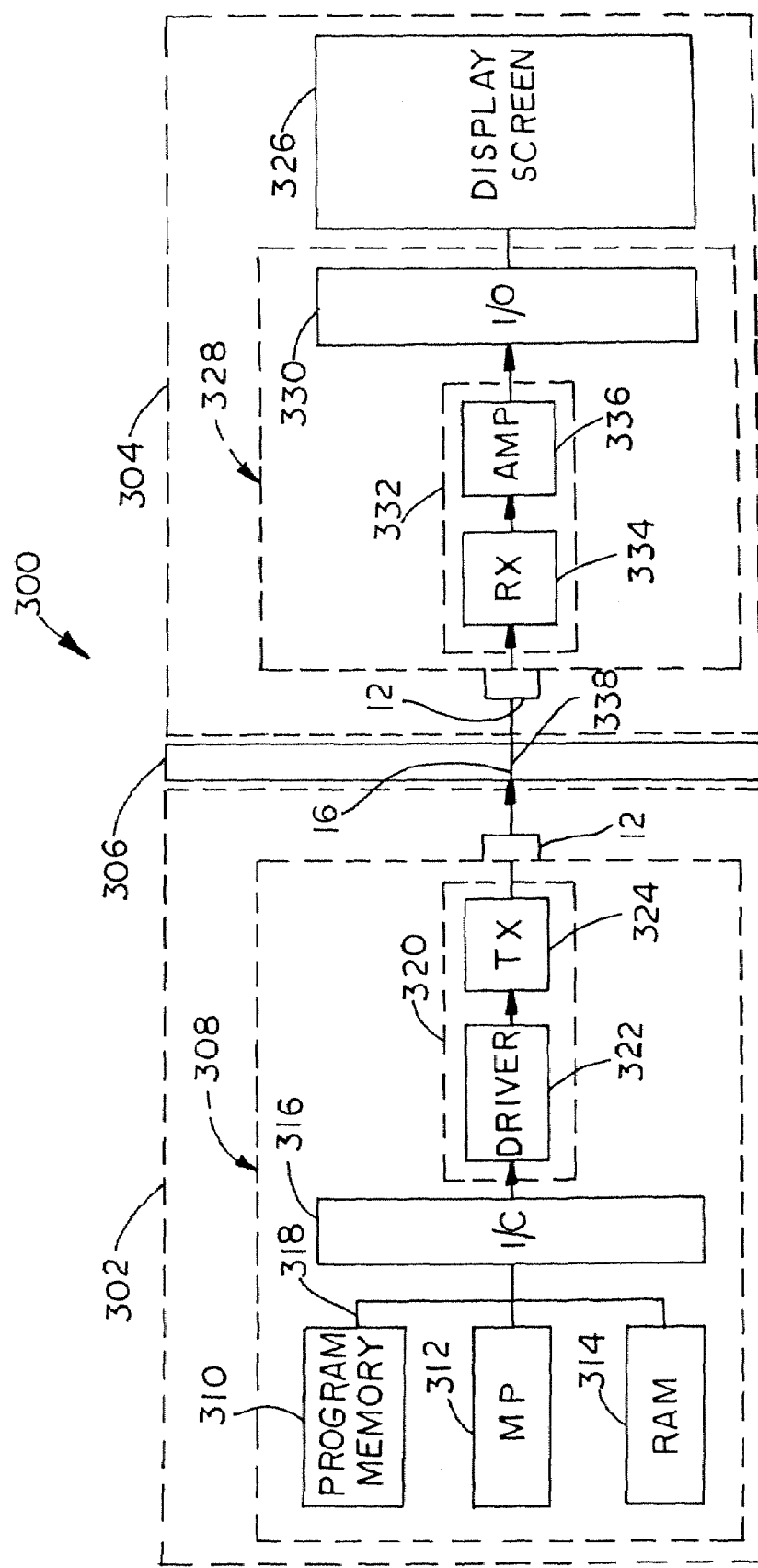
FIG. 10 is a schematic diagram of one example of a display system, which may utilize the electro-optical connector assembly of FIGS. 1-9.

For example, FIG. 10 is a block diagram of an example of a display system 300 utilizing with the electro-optical connection assembly 10 of the present invention to provide for electro-optical connectivity between components. Although the display system 300 is disclosed as a display system that may be utilized in a laptop computer, the display system 300 may also be used for any device that utilizes display systems, and, in particular, low-profile display systems. Referring to FIG. 10, the display system 300 includes a base portion 302 and a display unit 304 articulately coupled to the base portion 302 via a hinge 306 or other articulated joint that holds the base portion 302 and the display unit 304 together, but allows each to swing relative to the other. Although the hinge 306 may be a pin and channel hinge assembly, various other hinges or articulated joints may likewise be used. In another example, the display system 300 may combine the base portion 302 and the display unit 304 into a single, low-profile unit, and omit the articulated joint.

The base portion 302 includes a display controller 308, which may be a graphics accelerator card or other graphics card. The base portion 302 may further include a central controller (not shown) for providing display instructions to the display controller 308. The display controller 308 includes a program memory 310, a microcontroller or microprocessor (MP) 312, a random-access memory (RAM) 314 and an input/output (I/O) circuit 316, all of which may be interconnected via an address/data bus 318. Although only one microprocessor 312 is shown, the display controller 308 may include multiple microprocessors 312. Similarly, the memory of the display controller 308 may include multiple RAMs 314 and multiple program memories 310. Although the I/O circuit 316 is shown as a single block, the I/O circuit 316 may include a number of different types of I/O circuits. The RAM(s) 314 and program memories 310 may be implemented as semiconductor memories, magnetically readable memories, and/or optically readable memories, for example.

Although the program memory 310 is shown in FIG. 10 as a read-only memory (ROM) 310, the program memory of the display controller 308 may be a read/write or alterable memory, such as a hard disk. In the event a hard disk is used as a program memory, the address/data bus 318 shown schematically in FIG. 8 may comprise multiple address/data buses, which may be of different types, and there may be an I/O circuit disposed between the address/data buses.

The display controller 308 further includes an optical transmitter 320 operatively coupled to the I/O circuit 316. The display controller 308 may include a circuit substrate having a cutout portion, and the optical transmitter 320 may be disposed in the cutout portion and operatively connected to the circuit substrate as disclosed above with the electro-optical module 14 and lead frame 15. Although each of the additional components 310, 312, 314, 316 of the display controller 308 may be mounted on a surface of the circuit substrate, the circuit substrate of the display controller 308 may include a larger cutout portion, and/or additional cutout portions, and some or all of the components 310, 312, 314, 316 may be disposed therein, similar to the optical transmitter 320.

As with the electro-optical module 14 disclosed above, the optical transmitter 320 may include a lead frame, which may be a molded lead frame, and which provides an interconnect with the circuit substrate via an electrical lead frame. The optical transmitter 320 includes a laser driver 322 operatively coupled to a transmitting optical component 324, such as a diode laser. The laser driver 322 and the transmitting optical component 324 may each be mounted on the electrical lead frame. Although not shown, the optical transmitter 320 may also include a re-timer mounted on the electrical lead frame and operatively coupled to the I/O circuit 316 and the laser driver 322.

The display unit 304 includes a display screen 326 and a display driver 328 operatively coupled to the display screen 326. The display driver 328 may receive data relating to an image and cause the display screen 326 to display the image. The display screen 326 may be a flat-panel display screen, such as a liquid crystal display (LCD), a plasma display panel (PDP), a liquid crystal display (LCD), a liquid crystal on silicon (LCOS) display, a light emitting diode (LED) display, a ferroelectric LCD display, a field emissions display (FED), an electroluminescent display (ELD), a front projection display, a rear projection display, and a microelectromechanical device (MEM) display such as a digital micromirror device (DMD) display or a grating light valves (GLV) display, etc. The display screen 328 may further include organic display technologies such as an organic electroluminescent (OEL) display and an organic light emitting diode (OLED) display, as well as a light emitting polymer display.

The display driver 326 includes an input/output (I/O) circuit 330 and an optical receiver 332 operatively coupled to the I/O circuit 330. Each pixel element of the display screen 326 (and the sub-pixel elements thereof) may be operatively coupled to the I/O circuit 330. Although not depicted, the display driver 328 may include a gate driver and a source driver operatively coupled to each pixel element.

The optical receiver 332 may include a circuit substrate having a cutout portion, and the optical receiver 332 may be disposed in the cutout portion and operatively connected to the circuit substrate as disclosed above with the electro-optical module 14. Although any component of the display driver 328, including the I/O circuit 330, may be mounted on a surface of the circuit substrate, any component of the display driver 328 may be disposed in one or more cutout portions, similar to the optical receiver 332.

As with the circuit components disclosed above, the optical receiver 332 may include a lead frame, which may be a molded lead frame, and which provides an interconnect with the circuit substrate of the display driver 328 via an electrical lead frame. The optical receiver 332 includes a receiving optical component 334, such as a receiver PIN diode, operatively coupled to an amplifier 336, such as a transimpedance amplifier. The receiving optical component 334 and the amplifier 336 may each be mounted on the electrical lead frame. Although not shown, the optical receiver 332 may also include a clock and data recover unit mounted on the electrical lead frame and operatively coupled to the I/O circuit 330 and the amplifier 336.

The display controller 308 and the display driver 328 may be operatively coupled via an optical interconnect 338. In one example, the optical interconnect 338 is a fiber optic, such as, for example, the optical fiber 16. The optical interconnect 338 is operatively coupled to the optical transmitter 320 and the optical receiver 332 via a pair of optical fiber connectors 12 disposed on either end on the optical fiber 16. Optical signals relating to image data are generated by the display controller and transmitted by the optical transmitter 308 through the optical interconnect 338. The optical signals are received by the optical receiver 332, and the display driver 328 causes the display screen 326 to display the image by manipulating the pixels (or subpixels) of the display screen 326 according to the image data.

Utilizing the circuit packages as disclosed above in the display system 300, allows the display controller 308 and the display driver 328 to have a low profile where the optical transmitter 320 and the optical receiver 332 are coupled to the circuit substrate, respectively, which may assist in the design and placement of components in the base portion 302 and the display 304 unit, respectively. Further, most or all of the components of the display controller 308 and the display driver 328 may be coupled to their circuit substrate in a similar manner, thereby lowering the overall profile of the display controller 308 and/or the display driver 328. In turn, the base portion 302 and/or the display unit 304 may have lower overall profiles. Although the display system 300 is disclosed as including an optical transmitter 320 in the base portion 302 and an optical receiver 332 in the display unit 304, optical transceivers, as disclosed above, may be utilized instead, thereby allowing for two-way communications between the display controller 308 and the display driver 328, such as with a touch screen display system.

Although the teachings of the invention have been illustrated in connection with certain embodiments, there is no intent to limit the invention to such embodiments. On the contrary, the intention of this application is to cover all modifications and embodiments fairly falling within the scope of the appended claims either literally or under the doctrine of equivalents.

We claim:

1. An optical fiber connector for releasably coupling an optical fiber to an electro-optical module comprising:
   a housing having a bore sized to receive the optical fiber, the bore extending through at least a portion of the housing and terminating at a first end portion of the housing;
   a fiber retaining clip mounted to the housing, the fiber retaining clip constructed and arranged to secure the optical fiber between the fiber retaining clip and the housing, wherein the optical fiber terminates at the first end portion of the housing; and
   a pair of biased latching arms, each including a first end attached to a side of the housing adjacent the first end portion of the housing, each extending toward a second end portion of the housing terminating in a second end and being resiliently deflectable to permit movement of the second end between an inward release position and an outward lock position, wherein the second end comprises a terminal end of the latching arm, and wherein each latching arm comprises a locking projection disposed on the second end.

2. The connector of claim 1, further comprising a strain relief mounted to the housing at the first end portion of the housing and having a through bore extending through the strain relief and sized to receive the optical fiber.

3. The connector of claim 2, wherein the housing includes a top side, a bottom side, and a surrounding edge including a first edge, a second edge opposite the first edge, and a pair of side edges between the first and second edge, the housing further comprising an aperture disposed in the first edge of the housing, and a slot defined in the housing adjacent the aperture, wherein the strain relief is adapted to mount to the housing by insertion into the slot and the aperture.

4. The connector of claim 1, wherein the housing includes a slot formed within the housing, and wherein the fiber retaining clip is "L-shaped" and includes a portion extending into the slot.

5. The connector of claim 4, wherein the housing includes a retention tab extending outwardly from the housing and into the slot, and wherein the fiber retaining clip further includes a cutout sized to accommodate the retention tab, such that the fiber retaining clip is mounted to the housing at least by the engagement of the cutout over the retention tab.

6. The connector of claim 1, wherein the fiber retention clip includes a substantially planar clip surface having a cutout disposed within at least a portion of the clip surface, and wherein the cutout is sized to accommodate the passage of at least a portion of the optical fiber there through.

7. The connector of claim 1, wherein each of the latching arms is integrally attached at the first end of the latching arm to the housing forming a first pivot, each of the latching arms including a first arm portion and a second arm portion integrally attached to the first arm portion at a central interface forming a second pivot, the first arm portion extending between the first pivot and the second pivot, and the second arm portion extending between the second pivot and the second end of the latching arm.

8. The connector of claim 7, wherein each of the latching arms is shiftable between the releasing position and the locking position by pivoting about the first and second pivots.

9. The connector of claim 1, wherein the fiber retaining clip is frictionally mounted within a depression formed in an outer surface of the housing.

10. The connector of claim 1, wherein each of locking projections includes a camming surface disposed on a first side of the locking projection and a locking surface disposed on a second side of the locking projection, the camming surface arranged to deflect the latching arm toward the release position, and the locking surface arranged bear against a retention surface of a corresponding optics connector.

11. The connector of claim 1, wherein the first end portion of the housing comprises a mating extension and the housing further comprises an optical connector interface disposed on an end of the mating extension, wherein the bore extends through the mating extension and terminates at the optical connector interface, and wherein the optical connector is constructed and arranged to optically couple the optical fiber with a corresponding optical component.

12. The connector of claim 1, further comprising at least one female alignment bore disposed within the first end portion of the housing, the at least one female alignment bore constructed and arranged to mate with a corresponding male alignment post to align the optical fiber with a corresponding optical component.

13. An optical fiber connector for releasably coupling an optical fiber to an electro-optical module comprising:
- a housing having a bore sized to receive the optical fiber, the bore extending through at least a portion of the housing and terminating at a first end portion of the housing;
- a fiber retaining clip mounted to the housing, the fiber retaining clip constructed and arranged to secure the optical fiber to the housing; and
- a pair of biased latching arms, each including a first end attached to a side of the housing adjacent the first end portion of the housing, each extending toward a second end portion of the housing terminating in a second end and being resiliently deflectable to permit movement of the second end between an inward release position and an outward lock position, wherein each of the latching arms is integrally attached at the first end of the latching arm to the housing forming a first pivot, and each of the latching arms including a first arm portion and a second arm portion integrally attached to the first arm portion at a central interface forming a second pivot, the first arm portion extending between the first pivot and the second pivot, and the second arm portion extending between the second pivot and the second end of the latching arm, and wherein each latching arm comprises a locking projection disposed on the second end.

14. The connector of claim 13, wherein each of the latching arms comprise a leaf-spring shape having an apex at the central interface curving away from the housing and wherein the second arm portion is integrally attached to the first arm portion at the apex forming the second pivot.

15. The connector of claim 13, wherein each of locking projections includes a camming surface disposed on a first side of the locking projection and a locking surface disposed on a second side of the locking projection, the camming surface arranged to deflect the latching arm toward the release position, and the locking surface arranged bear against a retention surface of a corresponding optics connector.

16. The connector of claim 13, wherein the first end portion of the housing comprises a mating extension and the housing further comprises an optical connector interface disposed on an end of the mating extension, wherein the bore extends through the mating extension and terminates at the optical connector interface, and wherein the optical connector is constructed and arranged to optically couple the optical fiber with a corresponding optical component.

17. The connector of claim 13, further comprising at least one female alignment bore disposed within the first end portion of the housing, the at least one female alignment bore constructed and arranged to mate with a corresponding male alignment post to align the optical fiber with a corresponding optical component.

* * * * *